UNITED STATES PATENT OFFICE.

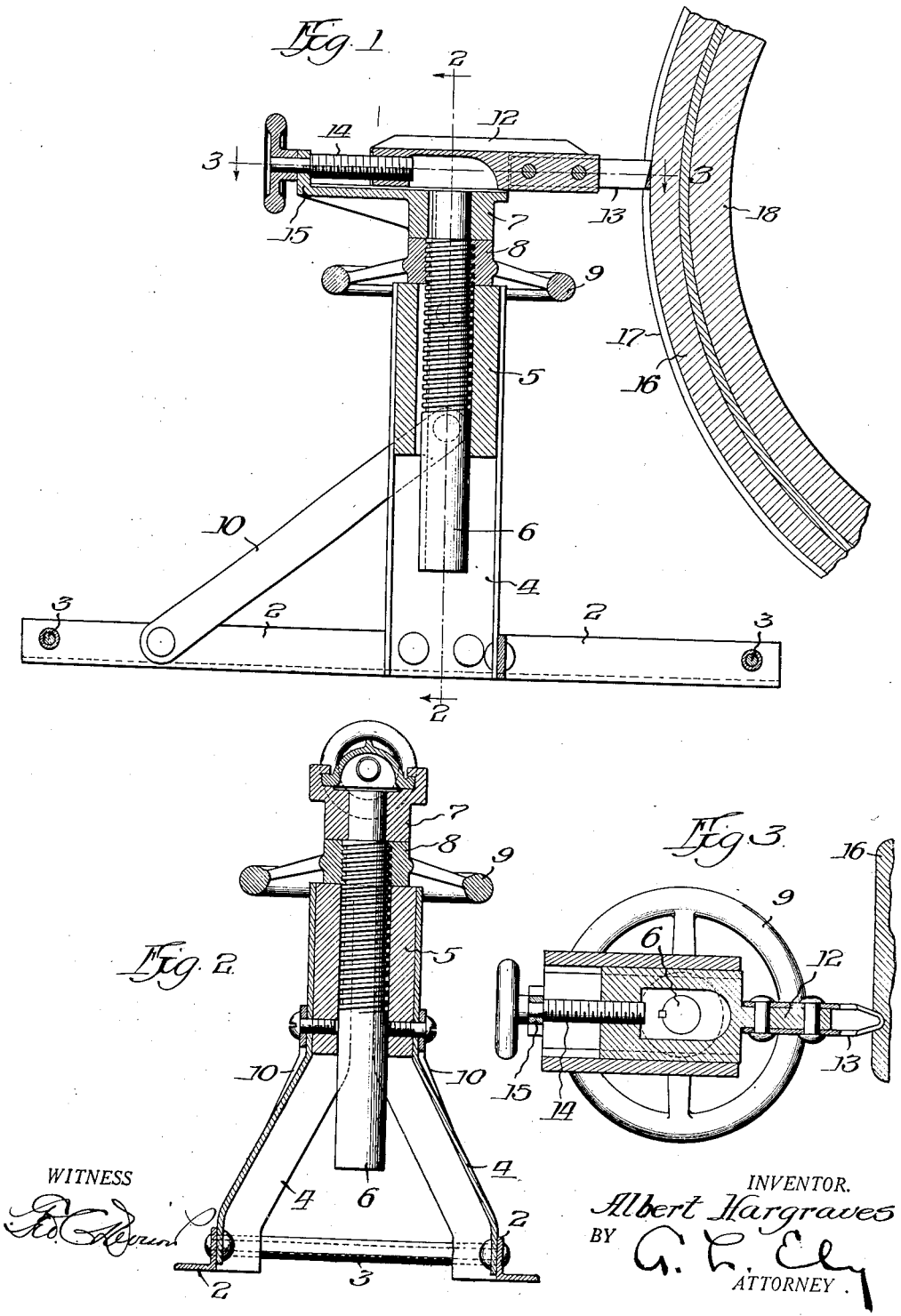

ALBERT HARGRAVES, OF AKRON, OHIO, ASSIGNOR TO THE FIRESTONE TIRE AND RUBBER COMPANY, OF AKRON, OHIO, A CORPORATION OF OHIO.

SOLID-TIRE-REGROOVING MACHINE.

1,404,118. Specification of Letters Patent. Patented Jan. 17, 1922.

Application filed July 2, 1918. Serial No. 243,065.

*To all whom it may concern:*

Be it known that I, ALBERT HARGRAVES, a subject of the King of Great Britain, residing at Akron, in the county of Summit, State of Ohio, have invented certain new and useful Improvements in Solid-Tire-Regrooving Machines, of which the following is a specification.

Grooved solid tires used for heavy duty on trucks, such as shown in the patent to Lee Clough, No. 1,268,437, dated June 4, 1918, wear down in service until the tread of the tire is on, or near, the level of the bottom of the grooves. It then becomes necessary to regroove the tire which is done by the apparatus shown herein.

Fig. 1 is a vertical section through the apparatus.

Fig. 2 is a section on the line 2—2 of Fig. 1.

Fig. 3 is a section on the line 3—3 of Fig. 1.

The apparatus comprises a base composed of angle irons 2—2 connected by cross rods 3—3 from which rises a pedestal or upright composed of channel irons 4 braced as at 10, in the upper end of which is secured a hollow sleeve 5 in the center of which is guided a vertical screw shaft, the upper end of which carries a block 7. Below the block is mounted a nut 8 which rests on the upper end of the sleeve and is provided with a hand wheel 9 by which it may be rotated to raise and lower the block. The upper end of the block is provided with a slideway 11 in which is a knife carrier 12 to the forward end of which is secured the U-shaped knife 13 the upper edge of which is formed with a cutting surface designed to cut channels or grooves of the proper shape in the tire and the front of which is beveled off or inclined slightly away from the cutting edge, as shown in Fig. 1. The rear of the knife carrier is in screw threaded engagement with a horizontal adjusting shaft 14 received in a boss 15 in the rear of the block.

The tire to be regrooved is shown at 16, the groove at 17 and the wheel body at 18.

In operating the apparatus, the wheel is jacked up and all grit, stones, and all other foreign substances are removed from the surface of the tire. The truck engine is now started in reverse and the knife carrier so adjusted by the wheel 9 that the knife is preferably slightly below the center of the wheel. The screw shaft 14 is now rotated so that the knife is fed slowly into the tire until a groove of the proper depth is obtained.

It is obvious that changes and modifications may be made in the apparatus within the scope of the appended claims without departing from the essential features of the invention.

I claim:

1. In an apparatus for grooving solid tires, a base, a vertically arranged sleeve supported on said base, a knife carrier above the sleeve, a shaft extending downwardly from the knife carrier and slidably arranged in the sleeve, means for adjusting the shaft vertically in the sleeve, a grooving knife secured to the knife carrier and means for moving the knife carrier horizontally.

2. In an apparatus for grooving solid tires, a base, a sleeve secured in the base, a vertical screw shaft in the sleeve, a block carried on the upper end of the screw shaft, an adjusting nut associated with the screw shaft, a horizontally movable knife carrier on the block, means for adjusting the knife carrier and a U-shaped grooving tool in the knife carrier.

ALBERT HARGRAVES.